(12) United States Patent
Longeroche et al.

(10) Patent No.: US 10,414,471 B2
(45) Date of Patent: Sep. 17, 2019

(54) DEVICE AND METHOD FOR A STRUCTURE SUBJECT TO OSCILLATING MOVEMENTS

(71) Applicant: GEPS Techno, Saint-Nazaire (FR)

(72) Inventors: Jean-Luc Longeroche, Saint-Nazaire (FR); Philippe Magaldi, Saint-Nazaire (FR)

(73) Assignee: GEPS Techno, Saint-Nazaire (FR)

( * ) Notice: Subject to any disclaimer, the term of this patent is extended or adjusted under 35 U.S.C. 154(b) by 108 days.

(21) Appl. No.: 15/512,196

(22) PCT Filed: Sep. 4, 2015

(86) PCT No.: PCT/FR2015/052356
§ 371 (c)(1),
(2) Date: Mar. 17, 2017

(87) PCT Pub. No.: WO2016/042235
PCT Pub. Date: Mar. 24, 2016

(65) Prior Publication Data
US 2017/0297663 A1    Oct. 19, 2017

(30) Foreign Application Priority Data

Sep. 18, 2014 (FR) .................................. 14 58824
Sep. 18, 2014 (FR) .................................. 14 58825

(51) Int. Cl.
*B63B 39/03* (2006.01)
*F03B 13/22* (2006.01)
(52) U.S. Cl.
CPC .............. *B63B 39/03* (2013.01); *F03B 13/22* (2013.01); *F05B 2240/931* (2013.01); *Y02E 10/38* (2013.01)

(58) Field of Classification Search
CPC ........... F03B 13/22; Y02E 10/38; B63B 39/03
See application file for complete search history.

(56) References Cited

U.S. PATENT DOCUMENTS 2,258,464 A * 10/1941 Moody .................... B63B 39/03
114/125
2,338,147 A *  1/1944 Steinen ................... B63B 39/03
114/122

(Continued)

FOREIGN PATENT DOCUMENTS

EP        0 059 652 A1   9/1982
GB         996276 A      6/1965
(Continued)

*Primary Examiner* — Thomas E Lazo
(74) *Attorney, Agent, or Firm* — Blank Rome LLP

(57) ABSTRACT

Device for a structure designed to tilt from one side to the opposite side, with the device comprising:
  at least one intermediate chamber (17) between the first and second edges,
  first and second side tanks (15a, 15b) communicating with the intermediate chamber(s) to manage liquid inputs and outputs, the side tanks each including a wall (19) which delimits them externally and being located towards the two extremities of the intermediate chamber, characterised with each side tank comprising:
  an upper section positioned so that it receives the liquid in line with the elongation direction (17a) of the intermediate chamber which supplies it,
  and a lower section which will connect to the upper section, with each of the upper and lower sections connected to the intermediate chamber(s) for the liquid inlets and outlets.

18 Claims, 4 Drawing Sheets

(56) References Cited

U.S. PATENT DOCUMENTS

| | | | | |
|---|---|---|---|---|
| 3,322,090 | A * | 5/1967 | Pangalila | B63B 39/03 114/125 |
| 3,452,705 | A * | 7/1969 | Bell | B63B 39/03 114/125 |
| 4,009,396 | A * | 2/1977 | Mattera | F03B 13/1805 290/42 |
| 4,392,061 | A * | 7/1983 | Dubois | F03B 13/22 290/53 |
| 6,857,155 | B2 * | 2/2005 | Yorigami | E01D 15/14 114/266 |
| 8,405,241 | B2 * | 3/2013 | Chen | F03B 7/00 290/53 |

FOREIGN PATENT DOCUMENTS

| | | |
|---|---|---|
| GB | 1358207 A | 7/1974 |
| RU | 2112692 | 6/1998 |

\* cited by examiner

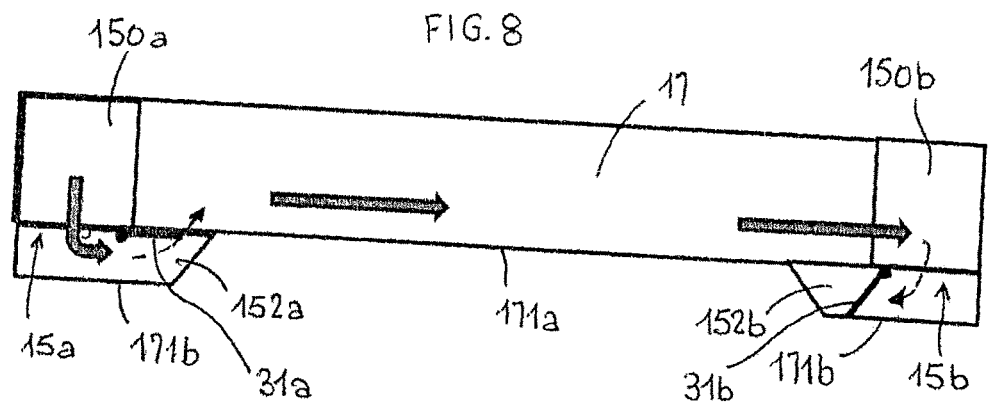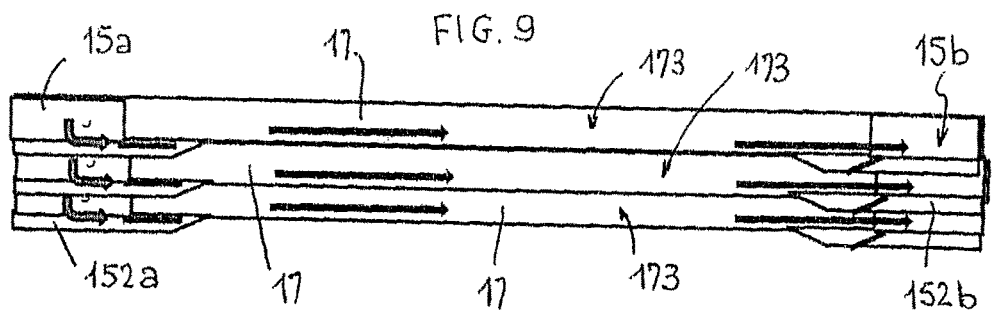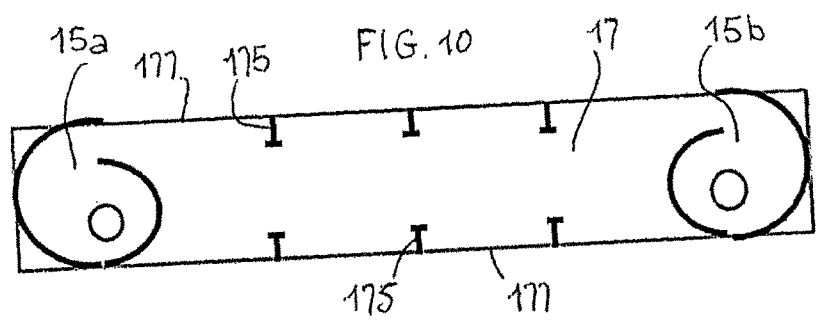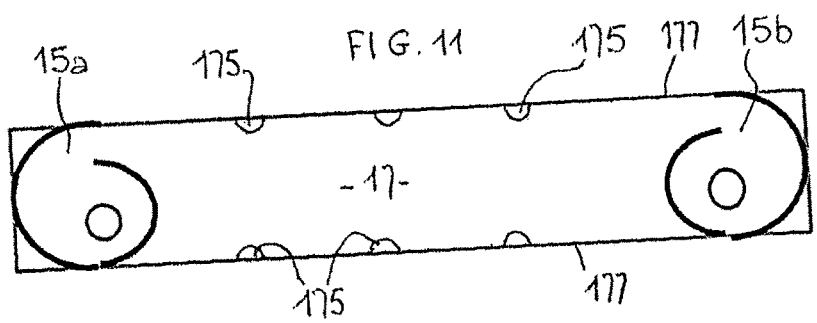

DEVICE AND METHOD FOR A STRUCTURE SUBJECT TO OSCILLATING MOVEMENTS

The invention relates to a device acting on a structure designed to undergo at least one tilting movement from a first edge to a second edge.

In this sector, and on a floating structure, such as a ship's surface, damping problems arise relating to the movement and/or energy production if turbines are present. In fact, the circulation of the liquid, intended to have an effect on the movement of the structure by acting against or at a different time to the swell, is often inappropriate.

The approach followed is characterised by the following:
splitting an overall volume into subvolumes,
positioning adequately these subvolumes relative to each other, and
being able to position, at the time of each movement from one edge to the other, almost the entirety of the liquid available at the lowest edge.

More specifically, it is proposed that the device comprises:
at least one intermediate chamber located between first and second edges,
a first side tank and a second side tank, both communicating with the intermediate chamber(s) to manage liquid inputs and outputs, the side tanks each including a wall (which delimits them externally and being located towards the two extremities of the intermediate chamber, towards the first and second edges respectively, with each side tank comprising:
an upper section positioned so that it receives the liquid in line with the elongation direction of the intermediate chamber which supplies it,
and a lower section positioned lower) which communicates with the upper section, with each of the upper and lower sections in communication with the intermediate chamber(s) for the liquid inlets and outlets.
Thus the following will apply:
circulation of the liquid from top to bottom in the side tanks,
and the lateral presence of a volume which receives the liquid in the extension of the elongation direction of the intermediate chamber, thus avoiding a bend or a significant change in direction of the supply fluid from the side tank considered.

Using, as mentioned below, an intermediate chamber (partially) filled with liquid on a free surface will allow use of the "FLUME" roll-dampening technology, through its G-SIRE or I-SIRE component.

The side tanks may be equipped with turbines.

In terms of the liquid's circulation, it is also recommended that a vortex or vertical tourbillon is created in the side tanks during passage of the liquid between the upper and lower sections. For this purpose, the following is recommended:
each communication between the upper section of the corresponding side tank and the intermediate chamber is positioned so that the liquid channeled by the intermediate chamber enters said side tank tangentially,
and/or that each wall which delimits the corresponding side tank externally is, at least towards the entry, wound in a coil around a vertical axis, when the device is horizontal. It will also be preferable for communications between the lower sections of the side tanks and the intermediate chamber are equipped with non-return valves.

Equipping these communications with these valves may make more sense as the intermediate will not have a separation partition, as soon as all the communications between the upper and lower sections of the side tanks and said chamber are unblocked in this chamber, making possible flow interferences between the moving liquid masses in both directions more significant.

However, with a view to encouraging an efficient liquid supply, which is effected as little as possible by oscillating movements disturbed by the wind or a swell, it is proposed that (at least) one intermediate partition is used in the intermediate chamber, which separates into a first circulation pipe and a second circulation pipe for this liquid between the side tanks, with each side tank communicating with the two pipes:
for the entry of said liquid into the tank, with a first passage through the tank's wall, in its upper section, and
for the exit of said liquid from the tank, with a second passage through the tank's wall, in its lower section.

A point which may also be important is the optimised liquid feeding of the (each) turbine which receives the liquid flow from the tilting in one direction (for example, roll from the first edge to the second) and this also when the side tanks include energy production turbines.

For this purpose, it is recommended that the upper and lower sections of each side tank communicate with each other via a spout.

Predefining the passage section for this spout based on the volume of the side tank concerned, the circulating water volume, estimated average conditions of the reciprocating tilting movement are supposed to apply allowing a good performance to be achieved.

However, to precisely regulate the flow of liquid from the upper section of each side tank, the recommendation is to vary the spout's passage section, preferably based on the installation's performance.

This aim can be achieved easily and reliably through the use of a deformable or adjustable diaphragm (for example, by controlling a variable section via an adjustable opening/closing mechanism).

With the aim of reducing the pressure losses and the issues affecting the liquid's circulation/rapid evacuation, the recommendation is to add an additional gaseous fluid circuit connecting the first and second side tanks, with no communication with the gaseous fluid present above the free surface of the intermediate chamber.

During tilting, the transfer of the gas acts to create an overpressure of the liquid emptying itself on the side of the rising edge, this with or without a valve.

In addition to the foregoing, the installation of the device on the structure is also concerned. Its size may be an issue as well as its positioning relative to the bridge(s), on a functional structure (commercial ship, trawler, platform subject to swell, etc).

As a consequence, the following is proposed, given that the device is considered to be horizontal:
either the intermediate chamber and the side tanks comprise a base situated at the same level, when the device is horizontal,
or, if space permits:
the intermediate chamber includes a base positioned at a first level,
the side tanks each have a base positioned at a second level, and
the first level is situated higher than the second level so that the liquid rises to move from the lower section of said side tank to the intermediate chamber, during tilting.

And to allow for adjustment of the tank's period by allowing the artificial increase in the resonance wavelength on the free surface, without creating additional dephasing, the intermediate chamber may include side walls with protruding accessories on the inner face of said side walls, in contact with the liquid.

It should also be noted, as already mentioned, that there might have an interest in equipping the device with at least a first turbine and a second turbine, both positioned in the upper section of the first and second side tanks respectively with each turbine preferably being vertical when the structure is at rest. In line with electrical energy production, we will offer a relevant solution to pressure loss (inducing performance issues) and construction problems (notably compactness).

In addition to the device presented, is also concerned a process on a structure subject to at least one tilting movement from one edge to another edge, characterised by the fact that, on board of the structure, in at least one elongated intermediate chamber, centred on the elongation direction, liquid is circulated to either edge, in the first and second side tanks which are supplied by inlet channels respectively situated in line with the elongation direction of the intermediate chamber.

In addition, and preferably:
towards each of the extremities of the intermediate chamber in its elongation direction, there will be an upper section of the side tank with which the intermediate chamber will communicate to supply the liquid,
and this liquid will then be evacuated towards said intermediate chamber through a spout separating said upper section supplied with liquid from a lower section of said side tank.

In addition, it will be possible to closely combine limiting the tilting of a ship and producing electrical energy, which is rather complex to do.

Despite this, it is for that aim that the invention proposes:
that, on the ship requiring stabilisation, be present a working liquid circulating following a path while generating a compensating torque for the effects of waves and swell on said ship,
the aforementioned device then comprising the following:
at least one alternator linked functionally to the turbines,
and electrotechnical control means for the energy generated by the turbine or the alternator in order to be able to stabilise the ship, at least relative to said tilting concerning the production of the alternator or the turbine's production.
In other words, the following will then be recommended:
while the ship tilts under the action of waves or a swell, to circulate in said ship of a liquid which will generate a compensating torque thus dampening the effect of the waves or the swell, and
for the production of electricity, to have on the ship at least one turbine positioned along the liquid's circulation path and connected to at least one alternator,
with the specificity, relative to the potential energy available at a given moment, of electrotechnically controlling or managing the mechanical energy generated by the turbine or the electrical energy drawn by the alternator.

Therefore, without limiting the flow or the quantity of working liquid available, keeping the flow or quantity of liquid available constant, the ship can be stabilised, as expected, or conversely, to be facilitate a suitable anti-tilting response, with a quality of water variable over time, from a tank of consumable liquid for example.

Is further concerned a structure:
wherein a oscillation or tilting movement around a horizontal axis is to be dampened, this structure being equipped with the damping, even energy production device, above presented in all or part of its characteristics,
or wherein the above process is implemented.

The other advantages and characteristics of the invention will become apparent from reading the description made as a strictly non-limiting example in relation to the appended figures, in which.

Figure 5:
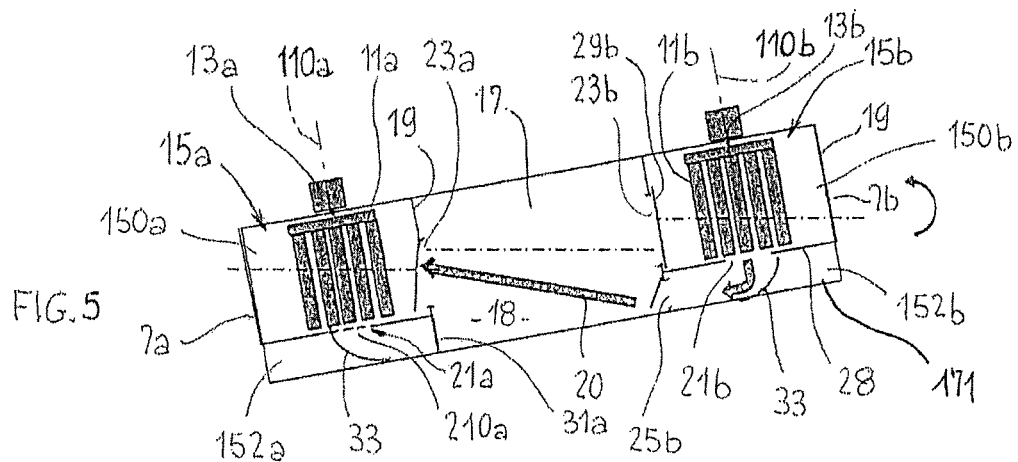

FIGS. 5 (side) and 6 and 7 (above) show another option with an axial intermediate wall (FIG. 8) or a wall inclined angularly (FIG. 9), and FIGS. 8 and 9 show, from the side, the proposals with offset bases and one (FIG. 8) or several tanks (FIG. 9);

and FIGS. 10 and 11 show, from above, the presence of protruding accessories on the inner face of the intermediate chamber's side walls.

Figure 1:
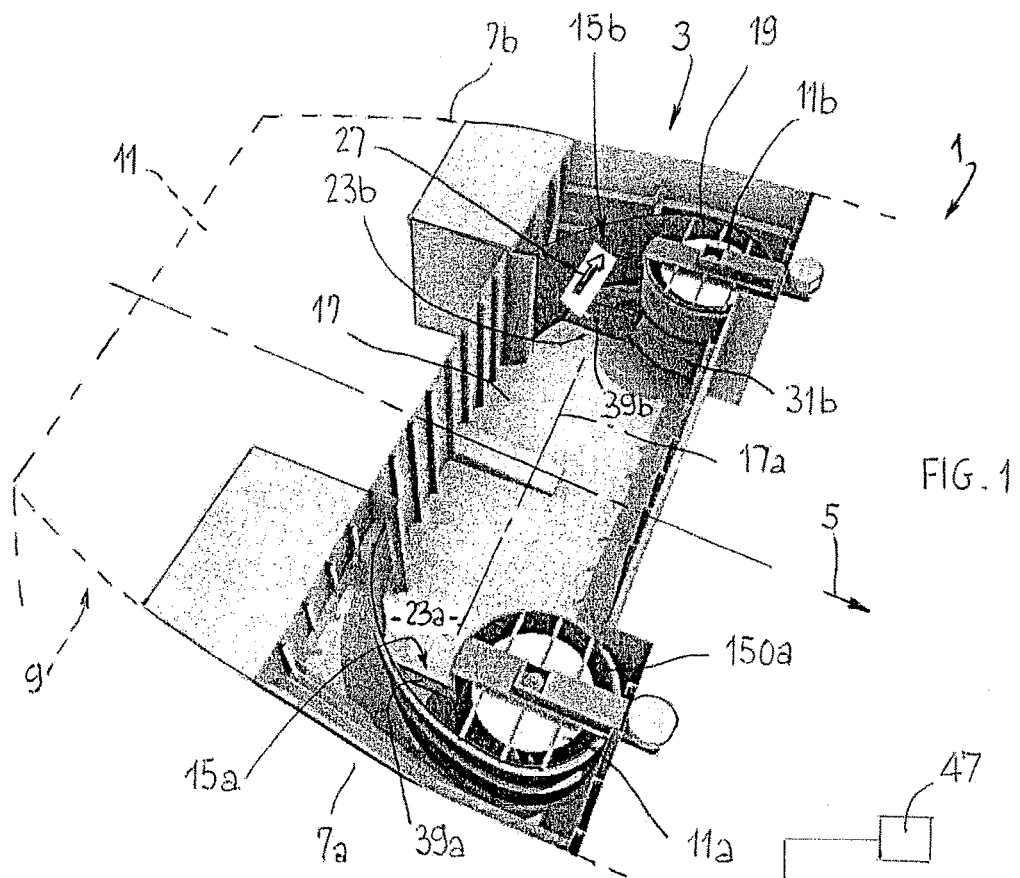
FIG. 1 is a partial perspective view with a pullout from a section of a ship's stern equipped with an energy damping, even energy production, device.

FIG. 1 shows an area from the rear section of a surface ship 1 equipped with a device 3 with the purpose of damping movements of this ship around a horizontal axis.

In the examples shown in FIGS. 1 to 7, device 3 also serves as an electrical energy production device, due to the presence of first and second turbines 11a, 11b positioned towards the first and second edges 7a, 7b respectively. Each turbine is connected to an alternator 13a, 13b operating as a generator. Preferably, the turbines will be mounted so that they always turn in the same direction.

But these turbines (and thus the alternators) may be omitted.

This ship 1 adapted to move forward here in direction 5 is an example of a structure designed to undergo at least one oscillating movement between the opposite edges 7a, 7b, typically under the effect of waves and/or swell. The ship 1 comprises a hull 9 and a bridge 11. Another structure may be agreed: platform, buoy, etc.

Device 3 comprises first and second side tanks 15a, 15b communicating with an intermediate chamber 17. These side tanks are situated towards the two extremities of the chamber, towards the first and second edges respectively 7a, 7b. They each comprise a peripheral wall 19 which delimits them externally, The chamber 17 is partially filled with a liquid 18 having a free surface, which can be water, fuel such as petrol or diesel or a denser liquid, to benefit from an inertia effect. The intermediate chamber 17 is elongated in a direction 17a which is horizontal on the illustrations, when the structure is at rest, between the first and second turbines. In this case, the side tanks have also preferably a free surface.

In the example of FIG. 1, the direction 1 is transverse to the longitudinal progression axis, here the direction 5 of the structure or ship considered.

To improve performance, construction and compactness, each side tank comprises (see FIGS. 1 to 5 specifically):
an upper section 150a, 150b to receive the liquid arriving from the chamber 17 via the entry 23a or 23b.

and a lower section 152a, 152b which communicates 21a, 21b with the upper section and with the chamber 17 for the exit of the liquid 25a, 25b respectively.

If the turbines 11a, 11b exist, they are to be positioned in the corresponding upper section of the side tanks 15a, 15b respectively.

The respective liquid entries 23a, 23b in the upper section 150a, 150b (as appropriate) are positioned so that the latter receives the liquid 18 (see level indicated in FIG. 5 particularly for mixed lines) in line with the elongation direction 17a of the intermediate chamber; arrow 20. Thus, bends and other changes of direction are avoided for the liquid flows, limiting pressure losses, even jolts. In practice, it is recommended, as in FIG. 1, that the inlet channels 23a, 22b are respectively positioned in line with, or in the axial elongation relative to, the elongation direction (axis) 17a.

Thus it can be specified, as shown and to further limit pressure losses, that each communication between the upper section 150a or 150b of the corresponding side tank and the chamber 17 is located so that the liquid from the chamber penetrates tangentially and, in the example, peripherally, in the side basin below (arrow 27, FIGS. 3, 6).

Thus, by being evacuated to the lower section of the tank concerned, through the passage 21a or 21b then to the chamber, the flow will swirl in a vertical vortex 110a or 110b, while entering the turbine (if it exists) tangentially, in its direction of rotation.

Figure 2:
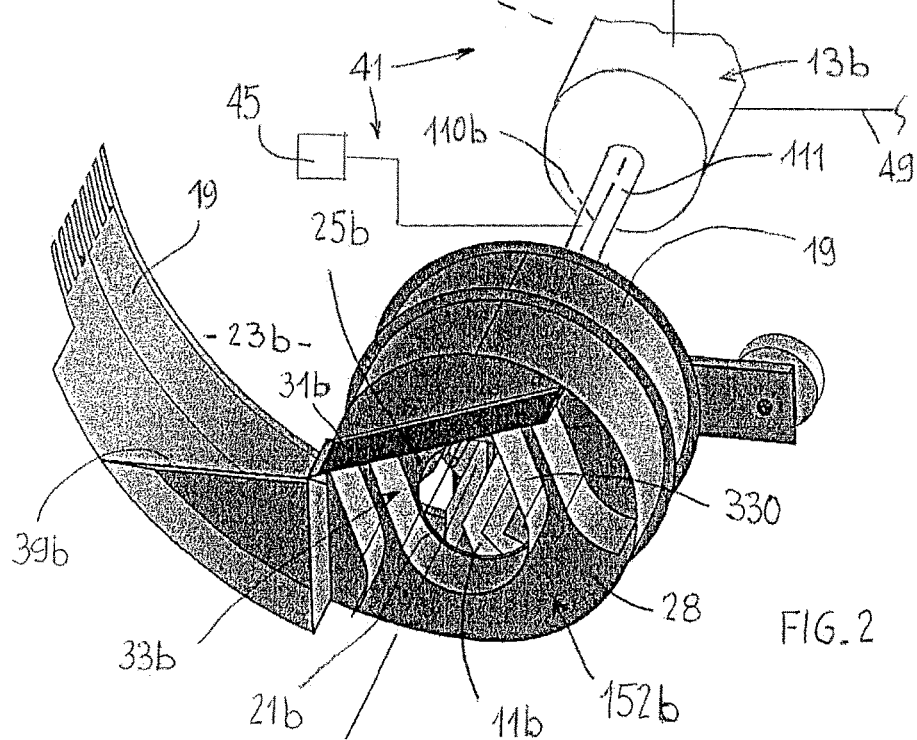
FIG. 2 shows a view from below, tilted, of one of the side tanks from FIG. 1, here with a turbine.
Figure 3:
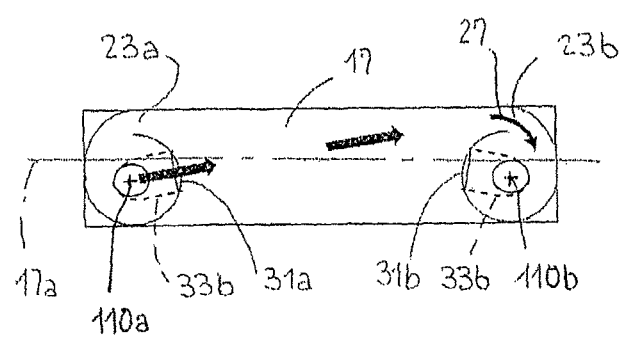
FIG. 3 shows the previous general solution from above.

On the various FIGS. 1, 2, 3 specifically), can also clearly be seen that each wall 19 which externally delimits the side tank 15a, 15b should preferably, particularly towards the tank's entry, be wound in a coil around the corresponding passage 21a, 21b and therefore around the associated vertical axis 110a, 110b. Horizontally, the tangential entry 23a, 23b into the upper section 150a, 150b will therefore be narrowed, at least until a portion of the wall 19 is reached in the cylindrical part of the circular section.

Figure 6:
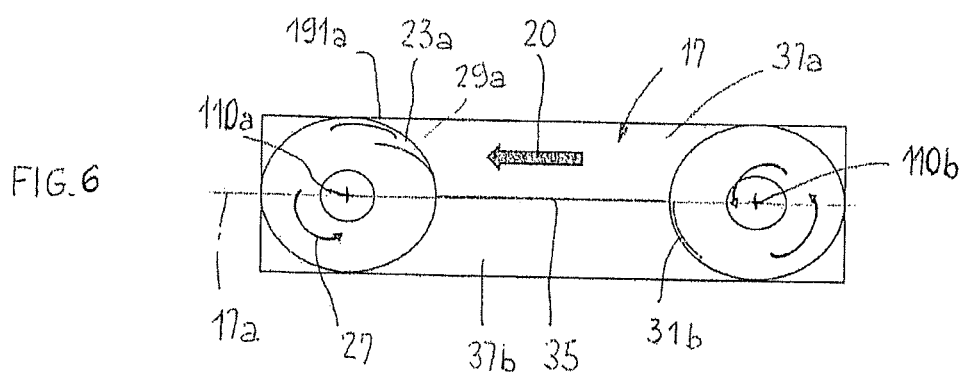

As shown, it is easy to understand the interest in the top communications 23a, 23b being laterally offset towards the exterior and thus being positioned closer to the side wall of the intermediate chamber 17 such as 191a which almost borders the top opening or communication 23a on FIG. 6, whereas the bottom communications 25a, 25b will be laterally offset towards the interior and thus positioned closer to the axis 17a, to laterally approach the axial/central position of the communication between the upper and lower sections 150b and 152b here.

Therefore, the side tanks will be supplied from the top, preferably tangentially, combined with evacuation from the bottom where the return to the transit chamber 17 takes place. Having two coils, the two tangential entries 23a, 23b, face-to-face, from one side of the axis 17a as shown in FIG. 3 will avoid influencing the orientation of the tilting around the structure's horizontal oscillation axis.

In this respect, there is a benefit in, if they exist, the first and second turbines 11a, 11 b having (structure 1 at rest) a vertical axis combined with that set out in 110a or 110b.

In practice, it is also recommended that the communications 21a, 21b each define a spout between the upper and lower sections of each side tank.

Of course, each spout 21a, 21b may present a predetermined section, adapted for average operating conditions. However, a deformable diaphragm should be used such as the one 210a for the spout 21a, FIG. 5. Therefore, each spout may be defined by a membrane or plate which will use elastic deformation or be controlled by a mechanism to monitor or adapt the movement of the fluid leaving the turbine concerned to this location. Thus by varying the passage section of the spout concerned, this encourages regulation of the liquid supply from the upper section of each side tank 15a, 15b. Using an inflatable annular pocket, by means of a gaseous fluid, and deflatable or able to be more or less filled under the pressure of a fluid is advisable.

Although the use of non-return valves 29a, 29b for the communications between the upper sections of the side tanks and the intermediate chamber 17 is optional, it will a priori be useful to have them (see 31a, 31b) for the lower communications 25a, 25b between the lower sections of the side tanks and the intermediate chamber. It will be understood that all non-return valves will open in the direction of the flows of the main liquid (when the structure tilts in one direction) and will close in the opposite direction to avoid, or limit, the backflow if all the liquid has not flower away from this area in the meantime. In practice, freely-tilting shutters are preferred.

Figure 7:
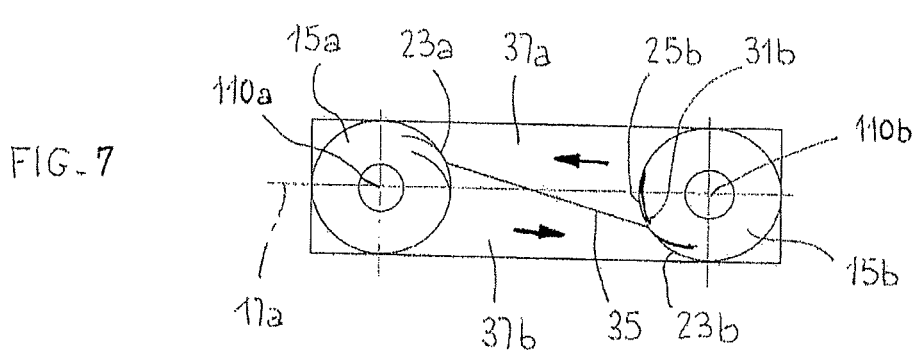

In the foregoing, the chamber 17 is a box not subdivided internally. However, it may be useful, to channel the liquid flows, to use a longitudinal partition 35 in the chamber 17. The partition 35 will then separate the chamber into a first pipe and a second pipe 37a, 37b for the circulation of the liquid between the side tanks, as shown in FIGS. 6 and 7.

Preferably, a diffuser will be placed under each spout 21a, 21b, curved here 33b. Each diffuser comprises, in said lower section 152a or 152b, a flow guidance side wall 330, FIG. 2 the opening of which corresponds to the corresponding communication 25b, FIG. 2 for the evacuation of liquid.

Figure 4:
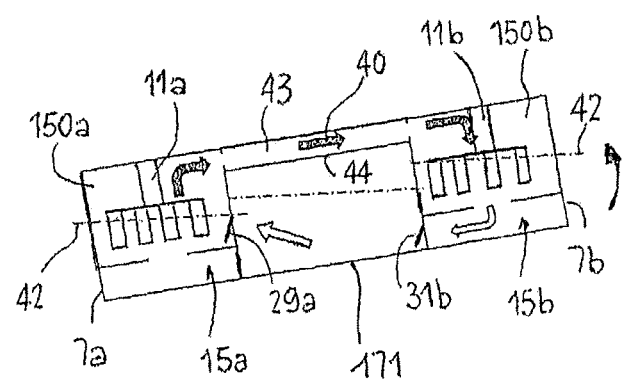
FIG. 4 shows a solution with an additional gaseous fluid circuit from the side.

FIG. 4, an additional gaseous fluid circuit is provided and functions as follows: The volumes of the gaseous fluid (such as air) in the upper sections 150a, 150b of the side tanks above the level 42 of the working liquid in these tanks communicate via a pipe 43 between them, along the chamber 17 from which it is separated by a partition 44. When, during tilting, one of the side tanks descends and is filled with working liquid, the rise in the liquid level in the upper section 150a compresses the gaseous fluid which rises and escapes through the pipe (arrow 40). This fluid then reached the other upper section, 150b, where it helps to lower the level, 42, in this section. This should work with all of the previous options with a free surface.

If the turbines 11a, 11b exist, the effect that their operation will have on the oscillation of the structure 1 will preferably be managed by the more or less significant collection of energy through these turbines, via the alternator(s) 13a, 13b and the related regulation system and this regardless of the level of fluid in the intermediate chamber. The size of the load will then depend, for example, on the power drawn from the alternator(s) and/or the rotation speed of the turbines.

To help with controlling the ship's oscillation, even its damping, energy production by the turbines and/or alternator(s) will be limited via the control of these turbines and/or alternator(s). Thus, a situation will possibly be favoured where, at the time when the wave reaches its maximum amplitude on the starboard side of the ship for example, the ship will be flat (zero amplitude) and the fluid 18 will all be on the starboard side (maximum negative amplitude).

At the entrance to the coils, in FIG. 1 can be noted the sloping ramps 39a, 39b which take the liquid to the upper sections 150a, 150b.

The non-return valves 31a, 31b are at their level here.

As shown in FIGS. 1, 4, 5, the chamber 17 and the side tanks comprise a base 171 situated at the same level, when the device is horizontal. There is less space.

The alternative in FIG. 8 shows a solution where, when the device is horizontal, the first level where the base 171a of the chamber 17 is located is higher than the second level where the base 171b of the side tanks is located, so that the liquid rises to pass from the lower section of said side tank into the chamber 17. The lower section 152a, 152b of the side tanks can then be a separate element which is added to the stabilising box formed of the chamber 17 and the upper sections 150a, 150b of the tanks. Specifically, it can have a shape calculated to limit pressure loses, in a divergent form towards the downstream valve. This option simplifies the construction and improves the efficiency of the volume of water providing stabilisation and an energy performance, if required.

FIG. 9 shows that the device can comprise several overlapping tanks 173 reach comprising a chamber 17 and the two related side tanks 15a, 15b.

FIGS. 10 and 11 show the presence of protruding accessories 175 on the inner face of the side walls 177 in the chamber 17. These accessories can be the height of said walls.

They may be profiled and symmetrical section accessories or T-shaped, L-shaped or flat stiffeners.

An acceleration effect of the liquid with a reduction in pressure loss can be expected. This must help to adjust the period of the tank by artificially increasing the resonance wavelength of the free surface, without creating additional dephasing. The result should be a reduction in the damping moment because less water is circulating in the side tanks. In the case where the turbines 11a, 11b are present, it can be specified that the effect of the device 1 on the rotation behaviour of the ship (parallel to the axis, 17a) and thus perpendicular to the longitudinal axis (5 on FIG. 1) is controlled, preferably in the presence of dephasing, by taking more or less energy through the turbines 11a, 11b, via the alternator(s) 13a, 13b shown in FIG. 1, and their regulation system and this regardless of the fluid level in the intermediate chamber.

The effect on the ship's oscillation will vary depending on the size of the load.

To help with controlling the ship's oscillation, even its damping, energy production by the turbines and/or alternator(s) will be limited via the control of these turbines and/or alternator(s). Thus, a situation will be able to be favoured where, at the time when the wave reaches its maximum amplitude on the starboard side of the ship for example, the ship will be flat (zero amplitude) and the fluid 18 will all be on the starboard side; side 7a on the figures (maximum negative amplitude).

As shown, the mechanical energy generated by the turbine or the electrical energy produced by the alternator will then be controlled (at least in principle), not by regulating the flow of the working liquid and/or by controlling the valves 29b, 31b but by electrotechnical control means 41 favouring the ship's stability in terms of its tilting relative to the electrical production of the alternator or mechanical production of the turbine concerned.

With performance and efficiency in mind, it is recommended that these electrotechnical control means for the mechanical energy generated by the turbine comprise at least of the following:
  means 45 to vary the turbine's speed of rotation,
  means 47 to vary the power produced by the alternator or one of the electrical parameters (such as voltage) determining this.

As shown in FIG. 2, the means 45 will preferably be linked to the connecting shaft between the turbine and the alternator 111, FIG. 2.

These control means 45, 47 can, for example, include batteries and/or automatic switching methods for the alternator on the ship's electrical network to create a sudden increase in demand, if regulation of the ship's balance is required (typically a phase offset in device 1 relative to the rotation period imposed on the ship by the swell). Thus, the corresponding energy will very quickly be taken from the kinetic energy stored in the rotating bulk. This will lead to a reduction in the rotation speed of these units thus favouring a possible variation to the working fluid's flow rate. Rotation which is more or less free from the shaft 111 is also possible for more or less effective braking.

The management or control of the "load" or power taken from the generator (turbine) may also be carried out by a PLC which will manage the opening and closing of the electrical circuit at high frequency. The closing time/elapsed time" ratio is a cyclical ratio and is very widely used by power management designers. This ratio is between 0 and 1. When it is close to 1: a lot of current passes and therefore a lot of power, which results in stopping the turbine. Electronically, move from 0 to 1 can occur by using switches with the effect being almost immediate on the turbine's rotation speed.

Although acting directly on the turbine's shaft 111 via an electronic gear box or any other electromechanical method forming part of the agreed means 45 is possible, this last solution is less complex that the previous one and offers greater reliability.

If the turbine is connected to the electrical generator via a gear box, it can also typically act from above via an electronic circuit.

Concerning the generators 13a, 13b, it is possible that these are synchronous machines so that the rotation speed of their rotor is variable, through the action of the control means 47 on them.

Specifically, the rotation speed can be controlled by acting of a number of pairs of poles, on motor slip (slip ring motor) and/or on the frequency of the general electrical network of the ship to which the generator is connected; see link 49, FIG. 2.

The invention claimed is:
1. A device acting on a structure designed to tilt from a first edge to a second opposite edge, with the device comprising:
  at least one intermediate chamber between the first and second edges,
  a first side tank and a second side tank both communicating with the at least one intermediate chamber to manage liquid inputs and outputs, the side tanks each including at least one wall which delimits them externally and being located towards two extremities of the intermediate chamber,
  wherein:
    each side tank comprises:
      an upper section positioned so that it receives the liquid in line with the elongation direction of the intermediate chamber which supplies it,
      and a lower section which communicates with the upper section through a first passage between the lower section and the upper section, with each of the upper and lower sections in communication with said at least one intermediate chamber for the liquid inlets and outlets through second passages,
    and each communication between the upper section of the corresponding side tank and the intermediate chamber is positioned so that the liquid channelled by the intermediate chamber enters said side tank essentially tangentially, around said first passage, at said upper section.

2. The device according to claim 1 in which said second passages between the lower sections of the side tanks and the intermediate chamber are equipped with non-return valves.

3. The device according to claim 1, wherein the intermediate chamber includes side walls with protruding accessories situated on inner side of said side walls, in contact with the liquid.

4. The device according wherein, when the device is horizontal:
the intermediate chamber includes a base positioned at a first level,
the side tanks each have a base positioned at a second level,
and the first level is situated higher than the second level so that the liquid rises to move from the lower section of said side tank to the intermediate chamber.

5. The device according to claim 1, wherein:
the upper and lower sections of each side tank communicate with each other using a spout which include a deformable diaphragm, and/or:
the upper and lower sections of each side tank communicate with each other using a spout under which a diffuser is located which, in said lower section, comprises a flow control side wall with an opening directed towards the corresponding liquid outlet communication from this lower section to the intermediate chamber.

6. The device according to claim 1, wherein each wall which delimits the corresponding side tank externally is, at least towards the entry, wound in a coil around a vertical axis, when the device is horizontal.

7. The device according to claim 1, which, for energy production on the structure, includes at least one first turbine and one second turbine both positioned in the upper section of the first and second side tanks respectively.

8. The device according to claim 7:
wherein, on a ship, said liquid is a working liquid circulating around the ship following a path while generating a restoring torque for compensating effects of waves and swell on said ship,
and which comprises:
at least one alternator connected functionally to the turbines,
and electrotechnical control means for controlling the mechanical energy generated by the turbine or the electrical energy produced by the alternator, in order to be able to favor a stabilization of the ship, at least relative to said tilting, with respect to the electrical production of the alternator or the turbine's mechanical production.

9. The device according to claim 7, wherein each turbine is a turbine with a vertical axis when the structure is at rest.

10. The device according to claim 1, wherein:
the intermediate chamber is partially filled with liquid having a free surface,
and an additional gaseous fluid circuit connects the first and second side tanks, without communication with the gaseous fluid situated above the free surface of the intermediate chamber.

11. A floating structure comprising the device according to claim 1.

12. The process acting on a floating structure as recited in claim 11 subject to at least one tilting movement from one edge to another edge, wherein, on board of the structure, in at least one elongated intermediate chamber centered on the elongation direction, liquid is circulated to either of said edges, in the first and second side tanks which are supplied by inlet channels respectively situated in line with the elongation direction of the intermediate chamber, with the liquid entering each side tank tangentially.

13. A process acting on a structure subject to at least one tilting movement from one edge to another edge, wherein, on board of the structure, in at least one elongated intermediate chamber centered on the elongation direction, liquid is circulated to either of said edges, in the first and second side tanks which are supplied by inlet channels respectively situated in line with the elongation direction of the intermediate chamber, with the liquid entering each side tank essentially tangentially, so that said liquid swirls around a vertical axis, when the liquid is evacuated downward.

14. The process according to claim 13, wherein:
towards each of the extremities of the intermediate chamber in the elongation direction, there is an upper section of the side tank with which the intermediate chamber communicates to supply the liquid,
and this liquid is then evacuated again towards said intermediate chamber through a spout separating said upper section supplied with liquid from a lower section of said side tank.

15. The process according to claim 14 wherein a vortex is created in the corresponding side tank during passage of the liquid between the upper and lower sections of the tank, the first and second side tanks and the first and second turbines being situated in line with the elongation direction of the intermediate chamber.

16. The Process according to claim 13, wherein, by circulating the liquid to one of said edges, the liquid is taken to first and second turbines positioned there, for energy production on the structure, the first and second side tanks and the first and second turbines being situated in line with the elongation direction of the intermediate chamber.

17. A device acting on a structure designed to tilt from a first edge to a second opposite edge, with the device comprising:
at least one intermediate chamber between the first and second edges,
a first side tank and a second side tank both communicating with the at least one intermediate chamber to manage liquid inputs and outputs, the side tanks each including at least one wall which delimits them externally and being located towards two extremities of the intermediate chamber,
wherein each side tank comprises an entry for said liquid which receives the liquid in line with the elongation direction of the intermediate chamber which supplies it, and
wherein each entry of the corresponding side tank is positioned so that the liquid:
enters said side tank essentially tangentially to a part of said at least one wall, and
swirls consequently around a vertical axis, when said liquid is evacuated.

18. The device according to claim 17, wherein each side tank comprises:
an upper section including said entry for said liquid, and
a lower section which communicates with the upper section, with each of the upper and lower sections in communication with said at least one intermediate chamber, for the liquid inlets and outlets.

* * * * *